United States Patent [19]
Wilmer

[11] 3,974,325
[45] Aug. 10, 1976

[54] INTERPOLATOR FOR FACSIMILE BANDWIDTH COMPRESSION

[75] Inventor: Michael E. Wilmer, Palo Alto, Calif.

[73] Assignee: Xerox Corporation, Stamford, Conn.

[22] Filed: Oct. 21, 1974

[21] Appl. No.: 516,454

[52] U.S. Cl. .................................. 178/6; 178/6.8; 178/DIG. 3
[51] Int. Cl.² ......................................... H04M 1/38
[58] Field of Search .................... 178/6, 6.8, DIG. 3

[56] References Cited
UNITED STATES PATENTS

| | | | |
|---|---|---|---|
| 2,810,780 | 10/1957 | Loughlin | 358/12 |
| 3,051,778 | 4/1962 | Graham | 178/DIG. 3 |
| 3,372,228 | 3/1968 | Law | 178/DIG. 3 |
| 3,463,876 | 8/1969 | Law | 178/DIG. 3 |
| 3,541,244 | 11/1970 | Law | 178/DIG. 3 |
| 3,632,867 | 1/1972 | Markow | 178/DIG. 3 |
| 3,715,483 | 2/1973 | Limb | 178/6.8 |
| 3,848,083 | 11/1974 | Townsend | 178/DIG. 3 |

Primary Examiner—Robert L. Griffin
Assistant Examiner—Edward L. Coles
Attorney, Agent, or Firm—Michael J. Colitz, Jr.; Terry J. Anderson; Anthony J. Sarli, Jr.

[57] ABSTRACT

In a facsimile transmission device, means for reducing the bandwidth which includes a clock rate halving flip-flop and an odd-even line switching flip-flop which are logically combined to transmit every second data bit in each line in a vertical stagger between lines. At the receiving end the missing bits are filled in by an interpolation device according to the data in the vertically adjacent bits or the horizontally adjacent bits.

12 Claims, 4 Drawing Figures

INTERPOLATOR FOR FACSIMILE BANDWIDTH COMPRESSION

BACKGROUND OF THE INVENTION

1. Field of the Invention

The present invention relates to bandwidth compression apparatus, and more particularly to facsimile data compression apparatus which is adapted to data transmission systems directed at true-false or black-white information.

2. Description of the Prior Art

In data transmission, and particularly in transmission of facsimile information such as information describing the black and white content of a printed page, there is typically much information which is passed describing character detail often beyond the noise level or the printing error level of character definition.

Typically, facsimile transmission is performed by a conventional scanner which selects a section of a page and which transmits by section coordinates data indicative either of the white or the black reflectivity status at those coordinates. The information therefore is in the form of either a black or a white where for example the black can be selected as a binary one and the white can be selected as a binary zero. When received, the data is reassembled according to the same coordinates in order to recreate the characters appearing on the page.

Such data compression techniques are generic both to facsimile transmission as well as transmission of data describing a TV image. In latter applications, the characters do not have a well defined edge and very often include gradations in contrast which is not required in hard edged character facsimile transmission, such as the image of a printed page. One such prior art system is described in U.S. Pat. No. 3,632,867 to Markow and is built around a variable velocity scanner and which further includes in its process a prescan of the page being transmitted in order to find scan groupings indicating white areas. Other prior art systems are exemplified by the patents to Law, U.S. Pat. Nos. 3,541,244; 3,372,228 and 3,463,876, all of which are particularly directed at television image bandwidth reduction and which in detail compress by transmission of alternate scanning coordinates with time. Such a technique, while particularly adapted to television picture transmission, is not effective for single image transmission since only every second pass the full scan field of the television image is transmitted. In this manner, transmission compression is accomplished by what in effect constitutes a real time filtering system, i.e., the display bandpass is in effect reduced by a factor of two and the information normally attenuated in such a generic filter constitutes the compression, or the effective reduction and bandwidth of the prior art transmission systems. The above references are considered typical of the prior art. While in each case these references address themselves to bandwidth compression techniques which are pertinent to the problems specifically dealt with, such techniques are overly complex when applied to facsimile transmission.

SUMMARY OF THE INVENTION

Accordingly, it is the general purpose and object of the present invention to provide a facsimile bandwidth compression technique which is simple to produce and which uses a minimum of commercially available parts. Other objects of the invention are to provide a simple image data compression system which reduces the amount of data transmitted for any one scan section by substantially one-half. Yet another object of the invention is to utilize a conventional interconnection of shift registers and logical gates in order to accomplish simple image bandwidth compression.

Briefly, these and other objects are accomplished within the present invention by transmitting only the alternate field position data bits of any scanned image. The omitted data bits are alternately either the odd or even field position bits depending on whether they are from an odd or even line scan. Thus, any two adjacent lines will be transmitted in stagger such that the field positions having the same vertical coordinates in these adjacent lines will contain transmitted information at least in one line. At the receiving end, the omitted data bits are recreated by vertical or horizontal interpolation which is configured to print a "black" signal if either the two horizontal adjacent bits are black or the two adjacent vertical bits are black.

The above functional description is carried out by the inventive arrangement of a photo-optical scanner disposed to translate across a scanned page for periodic sampling of the local reflectivity of the page. The sampling period is set by a sampling clock and the clock rate, together with the line density, or the number of translations across the page per unit dimension, set the resolution of the scanner. The clock, designated hereinafter as the video clock, is tied at its output to the T terminal of a first J-K flip-flop, which is configured as a divide-by-two flip-flop, to divide down the clock rate. At the same time a scanner carriage return signal is passed to the T terminal of yet another J-K flip-flop, also configured as a divide-by-two, which therefore changes in state at the complementary Q and $\overline{Q}$ outputs for each new line scan. The latter Q and $\overline{Q}$ outputs are then collected with the corresponding Q and $\overline{Q}$ outputs of the first J-K flip-flop at respectively a first and second NAND gate and the outputs of the first and second NAND gates are then collected at the input of a third NAND gate. The output of the third NAND gate is then connected to the T terminal of a D-type flip-flop which at the D terminal receives the video or scan data. The Q output of the D flip-flop is then transmitted.

In this manner, only every second timing signal, even in the first line and odd in the second line, is passed through the Q terminal of the D-type flip-flop. The transmitted data is received at a remote receiver and is passed along one branch to a first buffer flip-flop which is configured in the manner of a D flip-flop. The other branch of the receiver interface recovers the clock signal and passes the clock signal through a frequency doubler. The output of the D-type buffer flip-flop is passed to the input terminal of an n-bit shift register which at the carry output is connected to a second D-type buffer flip-flop and recirculated across a third buffer flip-flop to a second n-bit register. The first and second n-bit registers are generally configured to store 1 bit less than the number of bits in any one line scan. The second n-bit register dumps out the carry into a fourth buffer flip-flop, again configured as a D-type flip-flop. The Q outputs of the first and fourth buffer flip-flops are further connected at a first interpolator NAND gate while the Q outputs of the second and third buffer flip-flops are collected at a second interpolator NAND gate. The outputs of the first and second interpolator NAND gates are then collected in a third NAND gate, which is then clocked by concurrent receipt in a fourth NAND gate. A fifth NAND gate also receives the Q output of the second buffer flip-flop and combines the Q signal with the inverse of the clock recovery signal. The output of the fourth and fifth interpolator NAND gates is collected at a sixth interpolator NAND gate which in turn outputs to the D terminal of a video printer flip-flop clocked at the frequency doubler output rate.

This configuration is particularly adapted to the interpolator of either the two adjacent bits on either side of the unknown or blank bit or the two vertically adjacent bits. More specifically, the first and fourth buffer flip-flops are collected at one NAND gate while the second and third buffer flip-flops are connected at the other NAND gate. The connection of the first two NAND gates to a third NAND gate input results in a conventional Boolean OR collecting the AND, or the product, of the first two NAND gates. Thus, if either the vertically adjacent bits show a black area or the horizontally adjacent bits show a black area, the video printer will produce a black output. Otherwise, the video printer will produce a white. This manner of arrangement provides for a convenient interpolation scheme which restores the loss of information occurring through the transmission compression.

DESCRIPTION OF THE SPECIFIC EMBODIMENT

Generally, requirements for data compression originate through many alternative constraints. One such constraint is the switching time available out of any semiconductor switching device. More often, however, it is the bandwidth assigned to transmit data that dictates the maximum signal rate that can be passed thereacross. In the latter instance, the basic constraint is the transmission rate that can be passed or that can be transmited across any transmission system which in telephone or telegraph applications is typically below the switching rate of available semiconductor devices. Thus, in order to increase the capacity of any data transmission system, two alternatives can be selected. The first alternative is to increase the bandwidth of the transmission system and the second alternative is to compress more information within each data bit transmitted. Since typically bandwidth limitations exist as result of fairly fixed physical constraints, the most successful techniques in increasing capacity have been occurring in the field of data compression. Since there are many logical tradeoffs which can be made in any such compression technique, each particularly adapted for the kind or character of data subject to compression, there is no one unique or classically elegant technique by which such tradeoffs can be taken. In each instance, the tradeoffs depend on the data character, the data repetition rate and considerations like noise background and others. When applied to facsimile transmission of printed characters, any compression technique which interpolates between adjacent data bits either along a horizontal or vertical direction presents a substantial loss of fidelity only along axes which are off horiontal or vertical, i.e., on diagonal axes. Since most information on a printed page is in the form of a rectangular array, i.e., either in vertical or horizontal character segments, the attendant loss in information content by way of the loss of the diagonal is relatively insignificant.

Figure 1:
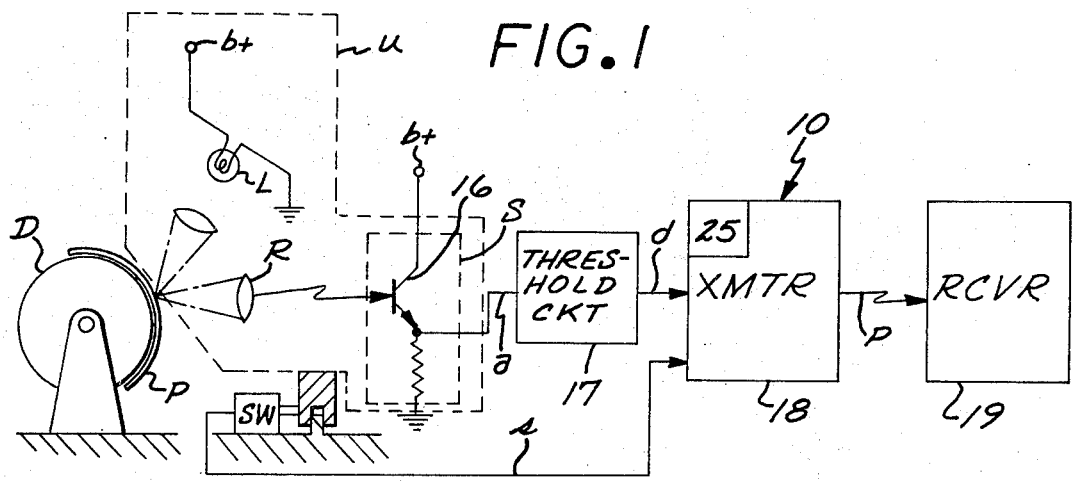
FIG. 1 is a block diagram of a data compression system constructed according to the present invention.
Figure 3:
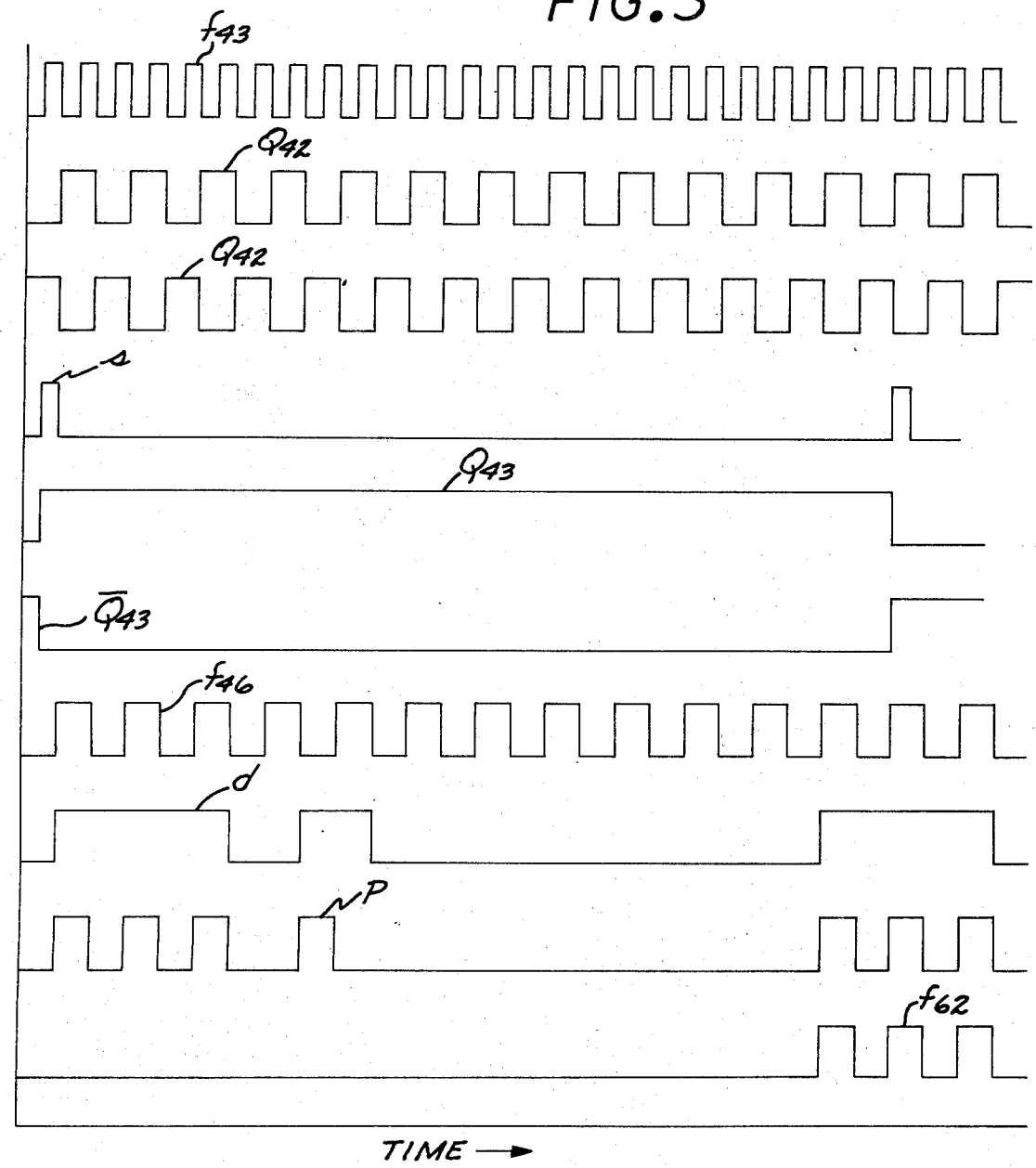
FIG. 3 is a signal chart illustrating the various signals developed by the circuit of FIG. 2.
Figure 2:
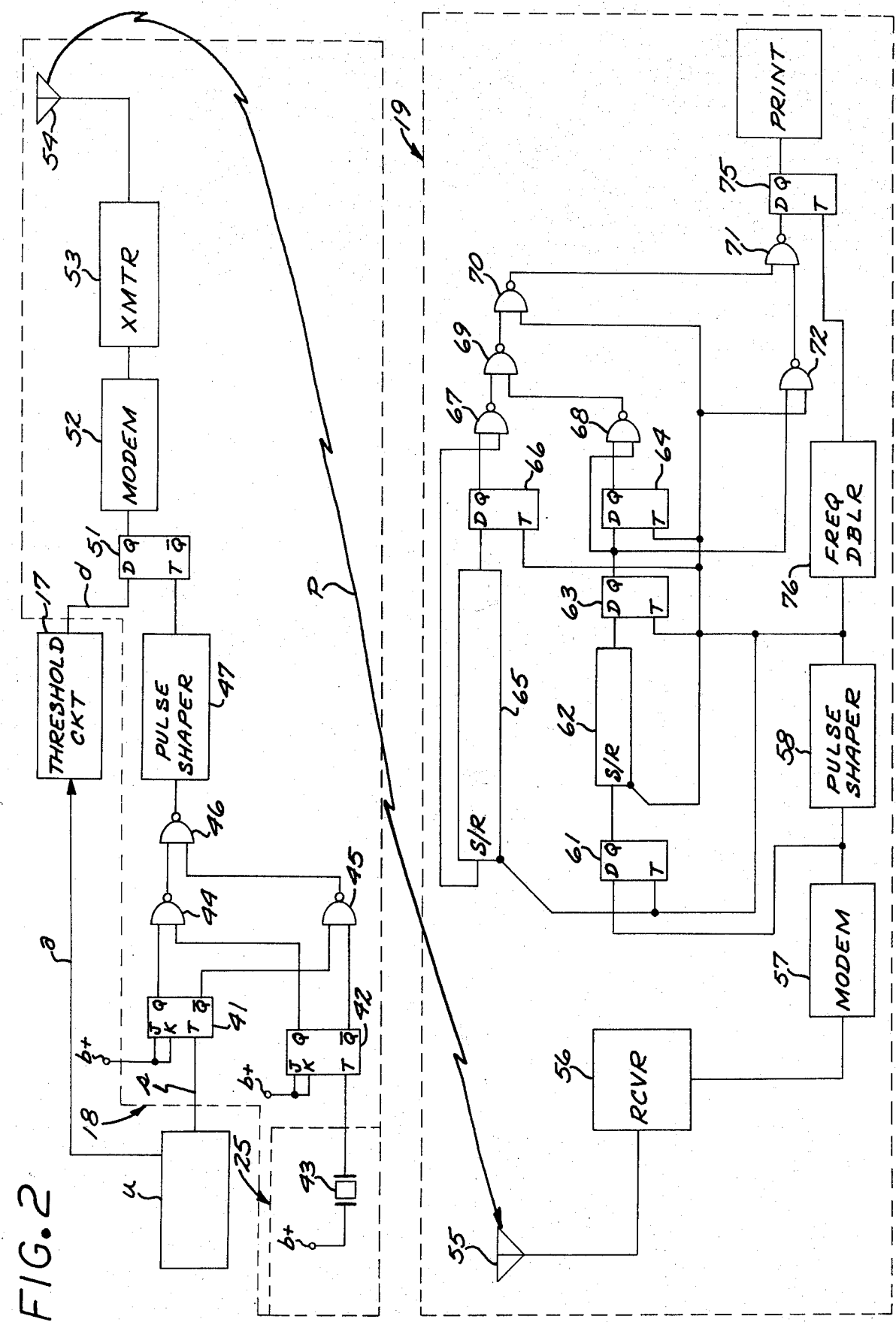
FIG. 2 is a generalized circuit diagram of the data compression elements of the system shown in FIG. 1.
Figure 4:
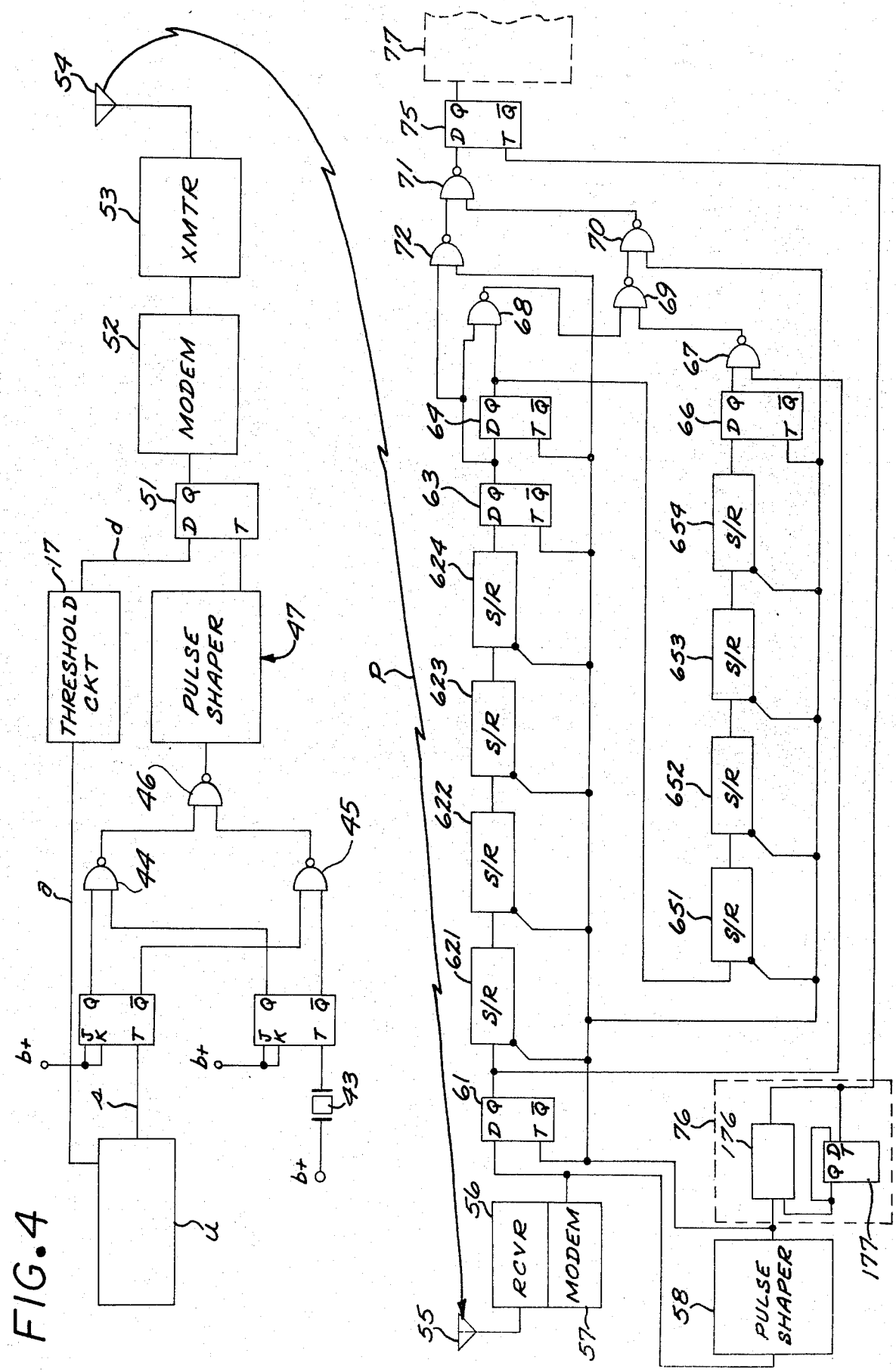
FIG. 4 is one specific illustration of a circuit constructed to operate according to the operation of the circuit shown in FIG. 2.

With the above introduction, the specific embodiment of the present invention is now set forth by way of reference to FIGS. 1, 2 and 4. It is to be noted that the particular circuit shown in FIG. 4 is only one example of reduction to practice and many other circuit chips may be selected to perform the same function. More specifically, the generalized circuit, as shown in FIG. 2, is assembled from generalized circuit elements such as the chips configured to perform a logical NAND or to operate in the manner of a shift register. While this description is considered adequate, a specific implementation with commercially available integrated circuits is set forth in FIG. 4.

As shown in FIG. 1, the general system incorporating the present invention is designated by the numeral 10. Such system includes any conventional scanning device 30, such as the scanning device utilized in the Xerox Telecopier TC400, which when broken down into parts comprises a rotary drum D on which a sheet of paper P is circumferentially mounted, an illuminating lamp L directing a beam of light through a lens T onto the paper P, that same beam being refleted to a scanner S which collects the beam at a receiving lens R. The lenses T and R and the source of light, or lamp L, and the scanner S are carried on a conventional transport mechanism U across the page P or along a peripheral axis parallel to the center line of the drum D. In this manner, a scan is made across the page P and any character patterns appearing on the page are picked off as changes in local paper reflectivity, and registering by way of a signal s each scan line developed by tripping a switch SW by each return stroke of mechanism U. The scanner S is typically implemented as a photo sensitive device which is disposed behind lens R, shown as a single photo sensitive transistor 16. The output of transistor 16 is an analog signal designated as signal $a$ which is received at a threshold device 17 to be converted to a discrete "on" or "off" signal depending on the local reflectivity level. The output of the threshold device 17, designated as signal $d$, is connected to the input of a transmitter designated 18. The transmitter 18 then either radiates, or conducts along fixed conductors, a signal $p$ to be received by the receiver 19.

The signal $d$ is in effect a pulse train which takes on either of two states according to the local reflectivity of the paper and therefore indicates whether the paper below the scanner is either above or below threshold. While there are many scanning techniques available on the market, the particular scanning technique shown by way of this example is the scanning technique provided in the Telecopier TC400. Any such conventional scanning technique, including the one referred to above, is essentially unreferenced relative the coordinate of the paper P and is conventionally coordinated in lateral translation by way of a clock. More specifically, a fixed rate of translation is assigned to the scanning transport U, which when referenced to any particular clock rate, can be converted to actual paper coordinates by any convenient counter. Thus, the inventive transmitter 18 includes a clock pulse generator designated by the numeral 25. This clock pulse generator is passed by a technique commonly referred to as MODEM to the receiver 19. More specifically, the information containing both the clock count and the black or white or threshold determination from threshold device 17 is passed on signal $p$ and is extracted from signal $p$ by conventional means. Accordingly, the system described in FIG. 1 is generic, both to the prior art devices and to the inventive circuit described hereinbelow, the inventive concept being incorporated within the block elements 18 and 19, i.e., by modification of the conventional transmitter and receiver, respectively, of the system.

The threshold device 17 is conventional in all respects, such as a conventional comparator by Fairchild 734 which is settable to switch over at any selected voltage, by way of the V ref pot setting (in the corresponding spec sheets by Fairchild Semiconductor).

As stated above, the inventive circuit is incorporated in the transmitter and receiver sections, 18 and 19 respectively. These are shown in more detail in FIG. 2, including the inventive circuit illustrated by way of conventional MSI circuit elements. It is to be noted that for purposes of teaching the invention, reference in this instance is made to what is considered typical logic elements in the art. While the description made in this manner is considered wholly adequate to illustrate the invention, reference should be further made to the specific embodiment shown in FIG. 4, which in detail shows a complete circuit description of the inventive circuit elements.

More specifically, shown in FIG. 2 is the transmitter 18 receiving a carriage return signal s from the scanner assembly U at the T terminal of a J-K flip-flop 41. The J and K terminals of flip-flop 41 are conventionally pulled up to a supply signal $b+$ so that the flip-flop acts as a divide-by-two on complementary outputs Q and $\bar{Q}$ clocked by the leading edge of the signal pulse on signal $s$. Shown aLso is a second flip-flop 42, again generally known in the art as a J-K flip-flop, configured similar to flip-flop 41 by pulling up the terminals J and K to voltage, or supply signal, $b+$. The T terminal of flip-flop 42 is in turn connected to a crystal 43 which again is powered by the signal $b+$. Crystal 43 is selected to generate a continuous train of pulses at a frequency matched in integer count with the carriage return signal $s$, the alternative leading edges of which gate flip-flop 42 to oscillate between states Q and $\bar{Q}$. The respective Q output terminals of flip-flops 41 and 42 are collected at the input of a first NAND gate 44, while the $\bar{Q}$ terminals of flip-flops 41 and 42 are collected at a second NAND gate 45. NAND gates 44 and 45, respectively, develop output signals which are in turn collected at a third NAND gae 46, which then outputs to a pulse shaper 47. Pulse shaper 47 can be any conventional unijunction transistor pulse circuit, or a similr cicuit controlling the pulse shape from NAND gate 46. The output of the pulse shaper 47 is connected to the clock signal input of a D-type buffer flip-flop 51 which at the D terminal receives the $d$ signal from the threshold circuit 17. Again, the Q output of flip-flop 51 is tied to the input of an encoder, known generally in the art as a MODEM, 52.

While reference is made to a MODEM circuit, other similarly performing circuits are useful in this application. Generally, a MODEM is an acronym for Modulation and Demodulation particularly adapted for telephonic data transmission and is quite broadly known in the art. By way of at least one reference. e.g., *Telecommunication and the Computer*, by James Martin, Prentice-Hall, Inc., 1969, the general performance of such devices is described.

The output of MODEM 52 includes a transmitter stage 53 which is shown terminating in an antenna 54 transmitting the signal $p$. At the receiver end, or within the receiver 19, signal $p$ is received at a complementary tuned antenna 55 connected to a receiver stage 56. For purposes of this description, any transmitter-receiver scheme can be utilized, such as any telephone link transmitter-receiver system having the bandpass necessary to pass the compressed data. The output from receiver 56 is branched along two legs, one going to the receiving MODEM 57 and thereacross to a clock recovery, or again a pulse shaper circuit 58. The other branch of the receiver output is directly connected to the D terminal of a D-type flip-flop 61 which at the clock terminal is connected to the output of the pulse shaper 58. The Q output of flip-flop 61 is connected to the data terminal of an n-bit shift register 62. Shift register 62 is clocked also by the output of pulse shaper 58. The carry output of shift register 62 is connected to the D terminal of yet another flip-flop 63 which again is clocked by the pulse shaper 58. The Q output of flip-flop 63 is connected to the D terminal of a buffer flip-flop 64, again configured as a D flip-flop, where the Q terminal output of flip-flop 64 is in turn circulated back to a second n-bit shift register 65. Flip-flop 64, similar to flip-flop 63, is also synchronized or clocked by the output of pulse shaper 58. Also, the shift register 65, similar to shift register 62, is clocked by the pulse shaper. The carry output of shift register 65 is again connected to the D terminal of yet another buffer flip-flop 66, again synchronized by pulse shaper 58 where the Q output of flip-flop 66 is collected together with the Q output of flip-flop 61 at the input of a first interpolator NAND gate 67. Pulse shapers 47 and 58 can be monostable multivibrators such as Texas Instruments Model No. SN74121.

In a similar manner, the Q output of flip-flop 63 and the Q output of flip-flop 64 are collected at yet another interpolator NAND gate 68. The output of NAND gates 67 and 68 are in turn collected at the input of a third interpolator NAND gate 69 and the output of NAND gate 69 is collected with the pulse shaper output signal at the input of a NAND gate 70. The output of NAND gate 70 is collected at the input of a NAND gate 71 together with the output of a NAND gate 72 where NAND gate 72 collects the Q output of flip-flop 63 together with the complement of the pulse shaper 58 output. NAND gate 71 is then passed to a print buffer flip-flop 75, being connected thereat at the D terminal where the clock input to flip-flop 75 is developed by a frequency doubler 76, shown in this instance as a circuit surrounding in a phase lock loop, around a phase locked device 176 (Exar Int. Systems Model No. XR215), including a D-type flip-flop 177 connected in a divide-by-two across the feedback. Doubler 76 is tied at the input to the output of pulse shaper 58. The Q output of flip-flop 75 then serves as the printer input to the conventional printer included in the TC400 Telecopier.

By way of the above description, a compression technique, together with an interpolation technique, are implemented wherein the carriage return signal $s$ is connected for a divide-by-two division together with the clock signal from crystal 43 which also is arranged as a divide-by-two. The outputs of the divide-by-two signal combinations are collected at NAND gates 44 and 45 such that an even-odd parity is established between the divide-by-two of the carriage return signal s and the divide-by-two of the crystal signal. In this manner, a coherent relationship is established between the odd and even bits of the crystal and the odd and even pulses of the carriage return. This configuration assures that the omitted or the compressed information is always arranged in a stagger through NAND gate 46. The length of shift registers 62 and 65 is arranged to each contain one line of scan minus one extra bit, where the three extra bits necessary to loop around a vertical array of three lines are contained in the buffer flip-flops. In this way, a vertical comparison across three lines can be made without requiring a three line capacity in the shift registers.

The foregoing description has been made by way of reference to generalized circuit chips. In order to lay down one operative embodiment, certain basic requirements are necessary. One such is the number of data samples taken within any one line scan. Since character resoluton, and therefore scanning density, are typically unique to the application contemplated, and since furthermore any paper area can be segmented, a scan density of 66 or 33 data bits per line of scan has been arbitrarily selected. In additon, the only other limitation necessary is the limitation of a mininum of three line scans per page. With these limitations, any shift register configuraton which shifts through 32 bits, or which has a 32-bit capacity, can be utilized.

One such shift register is the Texas Instruments, Inc. Model No. SN54/7491A 8-bit length shift register which is shown connected in FIG. 4 in a four-register cascade, including registers 621, 622, 623 and 624 and registers 651, 652, 653 and 654 replacing the shift registers 62 and 65. Such shift registers are typically capable of clock rates in excess of 10 Mhz and can be preloaded to any count less than thirty-two by proper interconnections on the preset terminals. In these applications, the shift registers are used without preset. Similarly, all D-type flip-flops are Texas Instruments, Inc. SN7474 flip-flops, intended to be utilized as flip-flops 51, 63, 64, 66 and 75. The J-K flip-flops, i.e., flip-flops 41 and 42, are selected as Texas Instruments, Inc. SN54/7470 series flip-flops. The above integrated circuit chips typically are all positive edge triggered dynamic elements arranged in a cascade of 68 bits with bits 1 and 68 connected at NAND gate 67 and bits 33 and 34 collected at NAND gate 68.

All NAND gates are typically dual emitter elements such as the Texas Instruments, Inc. SN54/7400 NAND gate. In this application, the interconnection of gates 44, 45 and 46 and flip-flops 41 and 42 forms an odd-even interlock between the signal from crystal 43 and the carriage return signal s. The interpolation circuit is similar in configuration with the AND X NOT logic of gates 67, 68 and 69 resulting in the following Boolean relationship:

output of gate 69 =(bit 1 AND bit 68) OR (bit 33 AND bit 34)

where the bit dimension between bits 1 and 68 is 67 bits, or one bit greater than the data bit content of two lines of scan, thus allowing for a vertical comparison across three adjacent lines, and bits 33 and 34 are the horizontal adjacent bits of the scanner data omitted. Accordingly, the logic elements included in FIGS. 2 and 4 are essentially unchanged in form.

Some of the many advantages of the present invention should now be readily apparent. The invention provides, by way of two shift registers including one more data bit than the one-half data bit count of two line scans, a technique for both compressing and recovering scanned information which is simple to use and easy to implement.

Obviously, many modifications and variations of the present invention may be made with regard to the foregoing description without departing from the spirit of the invention.

I claim:

1. In a scanning system adapted to sense the local reflectivity of a printed page at selected coordinates thereof, including a reflectivity scanner adapted for translation across said printed page, page translation means for advancing said page with each completion of a scanner translation, scanner return signal means for producing a signal indicative of each page advance, said scanner producing a binary scan signal of two distinct amplitudes corresponding to the local reflectivity of said printed page below or above a predetermined level of reflectivity, the improvement comprising:

clock means adapted to provide a series of pulses in integer relationship with the scanning translation of said scanner;

first divide-by-two means connected to receive said series of pulses from said clock means for providing a first complementary set of signal pulses changing in state upon receipt of every second one of said pulses from said clock means;

second divide-by-two means connected to receive said scanner return signal for producing a second set of complementary signal pulses changing in state upon receipt of every second one of said scanner return signals;

combining means connected to receive alternatively either the combination of said first and second signal pulses or the complements thereof and said scan signal for producing an output signal indicative of said scan signal upon preselected combinations of said pulse signals;

first shift register means operatively connected to said first divide-by-two means and said combining means for serially receiving said combining means output signal in synchronism with said first complementary set of signal pulses, and for shifting through to an output terminal at a predetermined pulse count delay of said combining means output signal;

buffering means connected to receive the output signal from said first shift register means, and said first complementary set of output signals for storing a predetermined combination thereof;

second shift register means connected to said buffering means and said first set of complementary signals for serially shifting through said buffering means output signals in syncrhonism with said first set of complementary signals to an ouput terminal at said predetermined pulse count delay;

logic means connected to receive the ouput signal from said buffering means and said second shift register means for producing an output signal when the chronologically adjacent signal pulses of said buffering means output signals are of equal amplitude or when said first shift register means input signal and said second shift register means output signals are of equal amplitude;

multiplying means connected to receive said first set of complementary signals for producing an output signal equal to an integer multiple thereof; and second combining means for receiving the output signal from said logic means and said multiplying means and for producing an output signal indicative of a synchronized combination thereof, such output signal controlling the operation of said scanning system.

2. Apparatus according to claim 1 wherein:
said first and second shift register means have a storage capacity of one line of scan, and said buffering means includes the storage capacity of one bit of said first set of complementary signals.

3. Apparatus according to claim 2 wherein:
said buffering means includes flip-flop circuits.

4. Apparatus according to claim 3 wherein:
said first and second divide-by-two means are flip-flops.

5. Apparatus according to claim 4 further including:
signal transmission means connected between said combining means and said first shift register means.

6. In a facsimile transmission system including a transported scanner adapted to scan along one line a page containing markings and to advance to a next line of scan upon completion of the prior scan, said scanner having advance signalling means for producing a pulsed line advance signal for each line advance and an output signal means for producing a binary scan signal comprising pulses indicative of the local reflectivity of said page relative a preselected reflectivity level, the improvement comprising:

dividing means operatively connected to receive said scan and said line advance signals for producing a pulsed output signal comprising a combination of selected repetitive pulses in said line advance signal and in said scan signal;

shift register means operatively connected to said dividing means for serially storing in cascaded progression consecutive ones of said dividing means output signals, said shift register means including pulse storage means for receiving pulses corresponding to two lines of scan plus one pulse of said scan signal; and logic means connected to consecutively sense the first and last pulse storage position of said storage means for producing an intermediate signal of one amplitude when the consecutively adjacent pulses advanced through said last storage position are of one amplitude and when said first and last storage positions include pulses of one amplitude.

7. Apparatus according to claim 6 further comprising:

transmission means interposed between said dividing means and said shift register means.

8. Apparatus according to claim 6 futher comprising:
clock means producing a series of clock pulses and connected to said dividing means for gating said binary scan signal in integer pulse synchronism with said line advance signal.

9. Apparatus to claim 7 wherein:
said combination in said dividing means includes a logical NAND and OR combination.

10. Apparatus according to claim 8 wherein:
said dividing means includes a first divide-by-two flip-flop connected to receive said series of clock pulses, a second divide-by-two flip-flop connected to receive said line advance signal pulse, a first NAND gate collecting the one outputs of said first and second flip-flops, a second NAND gate collecting the other outputs of said first and second flip-flops and a third NAND gate collecting the outputs from said first and second NAND gates.

11. Apparatus according to claim 10 wherein:
said logic means includes a frequency doubler operatively connected to receive said oneput of said first flip-flop for producing two output pulses for each pulse appearing on said one output, a fourth NAND gate collecting the first and last storage position in said shift register means, a fifth NAND gate collecting the adjacent two center positions in said shift register means, a sixth NAND gate collecting the outputs from said fourth and fifth NAND gates and a third flip-flop connected both to the output of said sixth NAND gate and said frequency doubler.

12. A facsimile data compression system comprising:
scanning means adapted for translation over a symbol, producing a serial stream of binary-valued scanning pulses, each scanning pulse corresponding in its binary value to the scanned reflectivity of said symbol relative a preselected level of reflectivity and providing secondary pulse signals signal concurrent with each scan line;

dividing means adapted to receive said scanning and secondary pulses for eliminating every other scanning pulse by using the odd or even count of said secondary pulses to produce staggered scan lines of the odd and even lines of said symbol, to produce a series of compressed data pulses;

shift register means connected to receive and temporarily store said compressed data pulses in cascaded translation; and interpolating means connected to receive the stored end pulses and two centrally adjacent pulses in said shift register means for producing an output signal when either both the end pulses or two centrally adjacent pulses are of one binary value.

* * * * *